Oct. 2, 1962
J. P. REARDON ET AL
3,056,865
MAGNETIC CUT-OFF FOR SCALES
Filed Oct. 7, 1960
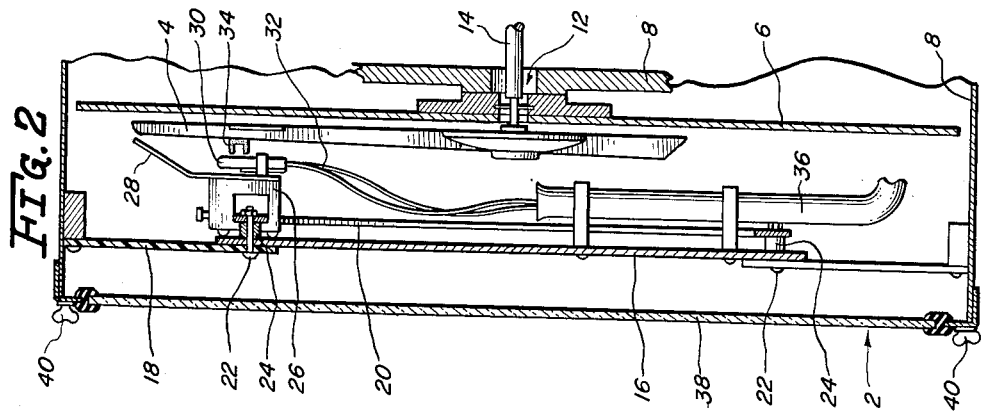
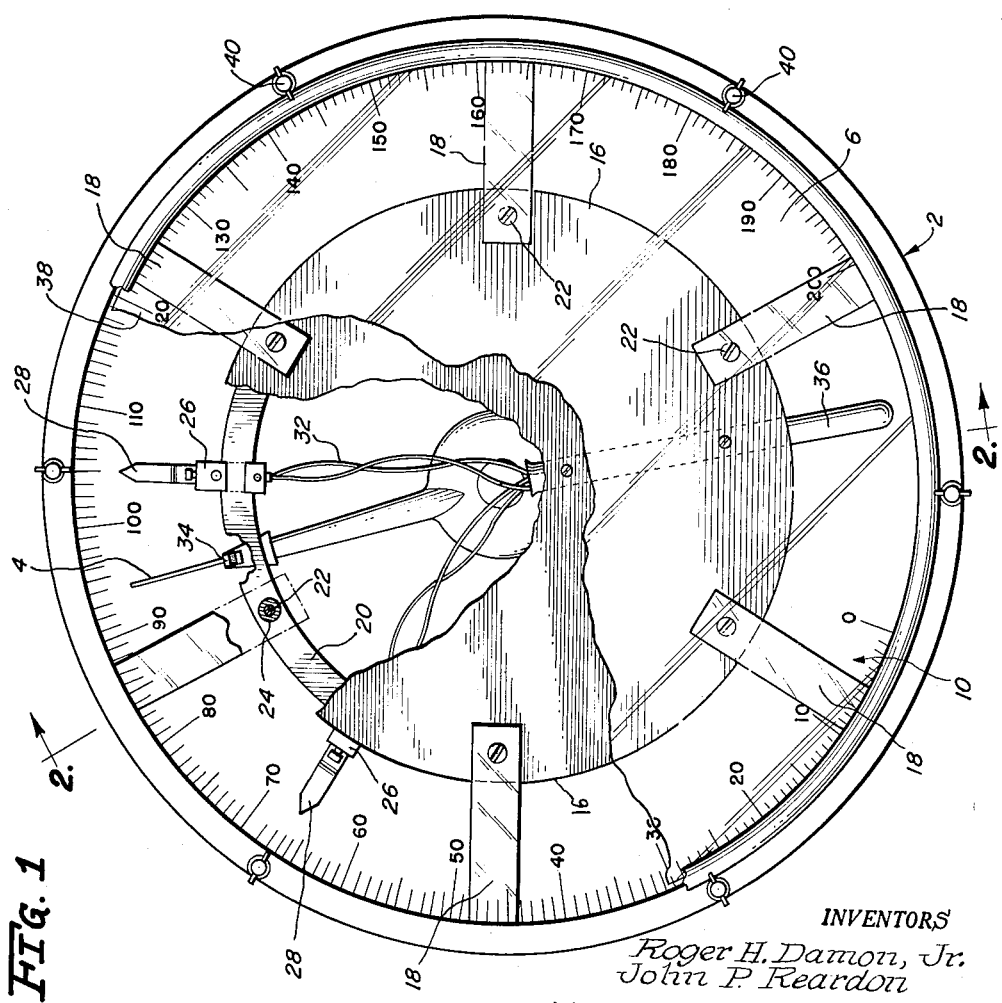
INVENTORS
Roger H. Damon, Jr.
John P. Reardon
By George A. Woodruff
Atty.

United States Patent Office 3,056,865
Patented Oct. 2, 1962

3,056,865
MAGNETIC CUT-OFF FOR SCALES
John P. Reardon, Rutland, and Roger H. Damon, Jr., St. Johnsbury, Vt., assignors to Fairbanks, Morse & Co., Chicago, Ill., a corporation of Illinois
Filed Oct. 7, 1960, Ser. No. 61,141
3 Claims. (Cl. 200—56)

This invention relates to scales and is particularly directed to novel means for providing an electrical signal when a preselected weight has been applied to the weigh frame of the scale.

In the weighing art, it is frequently desirable to provide means for establishing an electrical signal when a preselected weight has been applied to the weigh frame of the scale. Such a signal may be employed to drive a recorder, actuate a visual indicator located remote from the scale, operate control mechanism to slow down or stop delivery of material to the scale, or perform various other functions.

Numerous types of apparatus have been suggested heretofore for accomplishing such signalling. However, none of the prior art devices have been entirely satisfactory. Thus, it has been suggested to provide electrical contacts positionable about the dial with additional contact means carried by the scale pointer. As the pointer moves, the contacts carried by the pointer will make mechanical and electrical contact with the positionable contacts to complete a signalling circuit. However, should either of these contacts become bent, dirty or corroded, the circuit would not be completed. Moreover, a conductor must be connected to the contact carried by the pointer and this imposes a drag on the pointer which may result in erroneous readings. As an alternative, it has been suggested to mount a lamp on the pointer and to provide positionable photoelectric cells about the dial. However, this requires provision of means for shielding the photoelectric cell against actuation by extraneous light. Furthermore, dirt or corrosion may occur and prevent light from the lamp from reaching the photoelectric cell. In addition, a conductor must be provided to energize the lamp and this will result in drag on the pointer, as discussed above.

These disadvantages of the prior art are overcome with the present invention and novel signalling means are provided which are unaffected by dirt or corrosion and which cause no drag on the pointer.

The advantages of the present invention are preferably attained by providing magnetically operable switch means selectably positionable about the scale dial together with magnet means carried by the scale pointer for actuating said switch means to complete a signalling circuit.

Accordingly, it is an object of the present invention to provide novel electrical signalling means for scales.

Another object of the present invention is to provide novel signalling means for scales which is virtually unaffected by dirt or corrosion and which causes no drag on the scale pointer.

A specific object of the present invention is to provide novel signalling means for scales comprising at least one magnetically operable switch selectably positionable about the scale dial together with magnet means carried by the scale pointer for actuating said switch.

These and other objects and features of the present invention will be apparent from the following detailed description taken with referent to the figure of the accompanying drawing:

In the drawing:

FIG. 1 is a front view of the dial of a typical scale embodying the present invention; and FIG. 2 is a view, partly in section, taken on the lines II—II of FIG. 1.

In that form of the present invention chosen for purposes of illustration in the drawings, FIGS. 1 and 2 show a typical scale embodying the present invention having a dial face 2 and a pointer 4. The invention relates specifically to means selectably positionable about the dial face of a scale and operable by the scale pointer to complete an electrical circuit. Accordingly, the weigh bridge and other apparatus for detecting the weight of an article and translating such weight into rotation of the scale pointer do not constitute a part of the present invention and are not shown in the drawing. Thus, any suitable means may be employed to rotate the pointer 4 about the dial face 2.

The dial face 2 comprises a dial chart 6 which may be secured to the scale head, shown fragmentarily at 8, by any suitable means and which bears appropriate indicia 10 for cooperation with the pointer 4 to indicate weight. The dial chart 6 is provided with a centrally located aperture 12 through which projects a shaft 14 which is driven by the weighing mechanism and serves to rotate the pointer 4 about the dial face 2.

In front of the dial chart 6 and spaced a distance therefrom is a circular plate 16 having a diameter sufficiently less than that of the dial chart 6 so that, when mounted, the indicia 10 on the dial chart 6 will be clearly readable about the periphery of the plate 16. The plate 16 is preferably mounted concentric with the dial chart 6 and is secured in position by supports 18 formed of transparent material, such as Lucite. The plate 16 is preferably opaque and may, if desired, serve as a display area for advertising or the like. Mounted behind the plate 16 is an annular track member 20 which is secured to the plate 16 by suitable means, such as bolts 22 and spacer sleeves 24.

One or more slider members 26 are slidably mounted on the track member 20 adjacent the edge of the plate 20 so as to be selectably positionable thereabout. Each of the slider members 26 carries an index finger 28 which projects radially outward from the plate 20 and rearwardly to a position adjacent to the dial chart 6. Also carried by each slider member 26 is a magnetically operable reed switch 30. The switch 30 is connected by wires 32 to complete an electrical circuit between a suitable energizing source and the apparatus which is to be controlled by the scale. As noted above, the apparatus to be controlled may be a recorder, a visual indicator located remote from the scale, control mechanism for starting, regulating or stopping flow of material or may perform various other functions. The particular apparatus to be controlled does not form a part of this invention and, hence, is not shown in the drawing. To actuate the switch 30, a magnet 34 is mounted on the pointer 4 and is rotatable therewith. The magnet 34 is carried by the pointer 4 in such a way that, as the pointer 4 rotates about the dial chart 6, the magnet 34 will be brought into proximity with the switch 30 to actuate the switch. Preferably, a conduit tube 36 is provided to prevent the wires 33 from fouling the pointer 4. Moreover, a transparent cover 38 may be removably secured to the scale head 8, as by lock nuts 40 to protect the device against dust, moisture and the like while permitting access to the slides 26 to adjust the positions thereof.

In operation, with no weight on the scale, the pointer 4 will point to zero on the indicia 10 on the dial chart 6. The slider members 26 may then be adjusted about the dial chart 6, for example, to provide "dribble" and "cutoff" signals to control apparatus for feeding material to a scale hopper or the like. As material is supplied to the scale hopper, pointer 4 will be rotated about the dial chart 6. As the pointer passes under the first slider member 26, magnet 34 will actuate switch 30 to complete an electrical circuit. This circuit may, for example, serve to change the rate of flow of material to the scale hopper from "full flow" to "dribble." When pointer 4 passes under the second slider member 26, a similar circuit will be completed, for example, to cut off the flow of material to the scale hopper.

Obviously, switches 30 may be either normally open or normally closed type switches. Moreover, if desired, any one or more of the slider members 26 may be provided with a plurality of switches 30 so as to perform a number of operations simultaneously. In addition, numerous other variations and modifications may obviously be made without departing from the invention. Accordingly, it should be clearly understood that the form of the invention described above and shown in the figures of the accompanying drawing is illustrative only and is not intended to limit the scope of the invention.

What is claimed is:

1. Indicator signalling means comprising a dial chart having information indicia carried on the face thereof, an indicator mounted for movement with respect to said dial chart and cooperating with said information indicia to indicate information, a plate, means supporting said plate in a position to cover a portion of said dial chart while leaving said indicia exposed to view, a track, means mounting said track on said plate in spaced relation with the surface of said plate, slider means mounted on said track and slidably positionable therealong, finger means carried by said slider means and cooperating with said indicia to facilitate positioning said slider means with respect to said indicia, magnetically operable switch means carried by said slider means to control an electric circuit, conductive means connecting said switch means to other elements of the circuit to be controlled, and magnet means carried by said indicator for actuating said switch means.

2. Indicator signalling means comprising a generally circular dial chart having information indicia annularly distributed about the face thereof, an indicator mounted for rotation about said dial chart and cooperating with said information media to indicate information, a generally circular plate having a diameter substantially less than that of said dial chart, means supporting said plate concentric with said dial chart in a position to cover a portion of said chart while leaving said indicia exposed to vew, an annular track, means mounting said track on said plate in spaced relation with the surface of said plate, slider means mounted on said track and slidably positionable therealong, finger means carried by said slider means and cooperating with said indicia to facilitate positioning said slider means with respect to said indicia, magnetically operable switch means carried by said slider means to control an electric circuit, conductive means connecting said switch means to other elements of the circuit to be controlled, and magnet means carried by said indicator for actuating said switch means.

3. Weight signalling means comprising a generally circular dial chart having weight indicia annularly distributed about the face thereof, a scale pointer mounted for rotation about said dial chart and cooperating with said indicia to indicate weight, a generally circular plate having a diameter substantially less than that of said dial chart, means supporting said plate in position to cover a portion of said dial chart while leaving said indicia exposed to view, an annular track, means mounting said track on said plate in spaced relation with the surface of said plate, slider mounted on said track and slidably positionable therealong, finger means carried by said slider means and cooperating with said indicia to facilitate positioning said slider means with respect to said indicia, magnetically operable switch means carried by said slider means for controlling an electric circuit, conductive means connecting said switch means to other elements of the circuit to be controlled, and magnet means carried by said pointer for actuating said switch means.

References Cited in the file of this patent

UNITED STATES PATENTS

| | | |
|---|---|---|
| 1,136,407 | Carrigan | Apr. 20, 1915 |
| 1,283,660 | Camp | Nov. 5, 1918 |
| 2,973,414 | Bossemeyer | Feb. 28, 1961 |